United States Patent [19]
Babitsky et al.

[11] Patent Number: 4,795,878
[45] Date of Patent: Jan. 3, 1989

[54] SCANNER FOR INDUSTRIAL LASER MACHINES

[75] Inventors: Vladimir I. Babitsky, Mikhail E. Gerts, both of Moscow; Jury A. Ivanov, Ivanovo; Vladimir S. Maiorov, Moscow; Nikolai S. Makarov, Moscow; Alexandr N. Tresvyatsky, Moscow, all of U.S.S.R.

[73] Assignee: Institute Mashinovedenia im. A.A. Blagonravova an SSSR, Moscow; Nauchno-Issledovatelysky Tsentr Po Teklnologicheskim Lazerman an SSSR, Troitsk, both of U.S.S.R.

[21] Appl. No.: 105,381

[22] PCT Filed: Nov. 4, 1986

[86] PCT No.: PCT/SU86/00111
§ 371 Date: Jul. 2, 1987
§ 102(e) Date: Jul. 2, 1987

[87] PCT Pub. No.: WO87/02786
PCT Pub. Date: May 7, 1987

[51] Int. Cl.$^4$ ............................................. B23K 26/08
[52] U.S. Cl. ............................ 219/121.8; 219/121.64; 219/121.72; 219/121.85
[58] Field of Search ..... 219/121 L, 121 LM, 121 LW

[56] References Cited

U.S. PATENT DOCUMENTS

| | | | |
|---|---|---|---|
| 3,225,206 | 12/1965 | Strong et al. | 219/121 LW X |
| 4,139,258 | 2/1979 | Oharek | 350/6.8 |
| 4,163,600 | 8/1979 | Russell | 350/6.7 |
| 4,429,210 | 1/1984 | Sudor et al. | 219/121 LW |

FOREIGN PATENT DOCUMENTS

| | | | |
|---|---|---|---|
| 0055463 | 7/1982 | European Pat. Off. | 219/121 LW |
| 2444283 | 6/1980 | France . | |
| 2527792 | 4/1983 | France . | |
| 8509169 | 9/1985 | France . | |
| 2583325 | 12/1986 | France | 219/121 LW |
| 59-9882 | 4/1984 | Japan . | |
| 5111084 | 11/1984 | Japan . | |
| 2042763 | 1/1980 | United Kingdom . | |

*Primary Examiner*—C. L. Albritton
*Attorney, Agent, or Firm*—Lilling & Greenspan

[57] ABSTRACT

A scanner for industrial laser machines, which comprises a housing (1) accommodating a movable scanning element (4) a means (12) for inducing mechanical oscillations of the scanning element (4), which is mechanically connected to the housing (1), and a measuring transducer (19) responding to the mechanical oscillations of the scanning element (4). At least two collision pairs (5) are connected with the housing (1) and the scanning element (4). The measuring transducer (19) is connected to a phase shift unit (21) coupled to a saturation unit (24). The means (12) for inducing mechanical oscillations of the scanning element (4) and the saturation unit (24) are connected to a power amplifier (27).

33 Claims, 5 Drawing Sheets

SCANNER FOR INDUSTRIAL LASER MACHINES

TECHNICAL FIELD

This invention relates to scanners and, more specifically, to scanners for industrial laser machines.

BACKGROUND ART

Modern machine building industry demands that machine components are made more durable and resistant to wear. At present, one of the most promising methods for hardening work-pieces to make them more resistant to wear is laser heat treatment of workpiece surfaces. Scanning systems employed for such purposes in industrial lasers are the basic devices controlling the laser beam in order to ensure high quality and efficiency of laser treatment.

Known in the art is a scanner for industrial lasers (cf., French Patent Application No. 8,509,169), comprising a housing accomodating a movable scanning member, a means for inducing mechanical oscillations of the scanning member, which is connected with the housing, and at least two collision pairs, each such pair having two components secured so that they can interact with each other during displacements of the scanning member, one component being placed on the scanning member and the other in the housing.

However, this scanner is deficient in that, in order to reduce the effect of parameter fluctuations of the means for inducing mechanical oscillations and the scanning member on the operational conditions of the scanner, the speed of scanning is deliberately brought down. If the scanning speed is increased, the collision mode of operation can be upset and the scanner starts to operate in a collision-free mode at a low scanning speed and amplitude. In other words, the operation of the scanner is totally disturbed.

Besides, the deliberate reduction of the scanning speed in this scanner results in a lower collision speed of components of collision pairs. This leads to deviation from the desired optimal (sawtooth) scanning law and deterioration of the scanning accuracy.

DISCLOSURE OF THE INVENTION

It is an object of this invention to provide a scanner for industrial laser machines, which is equipped with such additional units as to increase the speed of collisions in collision pairs without increasing the power of the means for inducing mechanical oscillations of the scanning element, and also to raise the accuracy of scanning.

This is achieved in that a scanner for industrial laser machines, comprising a housing accomodating a movable scanning element, a means for inducing mechanical oscillations of the scanning element, which is mechanically secured to the housing, at least two collision pairs, each pair having two components secured so that they can interact with each other during the movement of the scanning element, one component being secured on the scanning element and the other in the housing, according to the invention, additionally comprises a measuring transducer which responds to mechanical oscillations of the scanning element, a phase shift unit whose input is connected to the measuring transducer, a saturation unit whose input is connected to an output of the phase shift unit, and a power amplifier whose input is connected to the saturation unit and whose output is connected to the means for inducing mechanical oscillations of the scanning member.

Advisably, the scanner for industrial laser machines should additionally comprise a frequency meter connected to the output of the phase shift unit and a saturation level control unit coupled to the frequency meter, while the saturation unit should feature at least two control inputs connected to respective outputs of the saturation level control unit.

Desirably, in the scanner for industrial laser machines, the saturation level control unit should comprise a division unit whose one input is the input of the saturation level control unit, while the other input thereof is connected to a constant voltage source, inverting and noninverting direct-coupled amplifiers, the input of each direct-coupled amplifier being connected to an output of the division unit, while the output of each such direct-coupled amplifier is the respective output of the saturation level control unit.

Reasonably, the scanner for industrial laser machines should additionally comprise a periodic signal generator whose output is joined with the output of the saturation unit and connected to the input of the power amplifier.

It is also advisable that in the scanner for industrial laser machines the phase shift unit should comprise a component selected from a group comprising a phase shifter, a corrector circuit, and a filter in this order, individually or in combination.

It is also desirable that in the scanner for industrial laser machines the phase shift unit should comprise a phase shifter and a correction circuit connected in series to each other.

It is also reasonable that in the scanner for industrial laser machines the phase shift unit should comprise a phase shifter and a filter connected in series.

Besides, it is advisable that in the scanner for industrial laser machines the phase shift unit should comprise a correction circuit and a filter connected in series.

Besides, it is desirable that in the scanner for industrial laser machines the phase shift unit should comprise a phase shifter, a correction circuit, and a filter connected in series to one another.

Besides, it is reasonable that in the scanner for industrial laser machines the phase shift unit should additionally have at least two control inputs, and the scanner should additionally comprise a phase shift control means having outputs whose number is equal to that of the control inputs of the phase shift unit, each output being connected to a respective input of the phase shift unit.

Possibly, in the scanner for industrial laser machines the phase shifter should have two control inputs, each input being connected to a respective output of the phase shift control means.

It is also possible that in the scanner for industrial laser machines the correction circuit should have four control inputs, each control input being connected to a respective output of the phase shift control means.

In addition, it is possible that in the scanner for industrial laser machines the filter should have four control inputs, each control input being connected to a respective output of the phase shift control means.

Preferably, in the scanner for industrial laser machines, the phase shift control means should be a microprocessor.

This invention is used to achieve a higher frequency of scanning and, consequently, a higher speed of scanning.

Besides, this invention is used to provide operational scanning conditions on the basis of an optimal (sawtooth) scanning law, which can improve the accuracy of scanning.

This invention can also provide stable free-running operation of the scanner, which improves its noise immunity and prevents disruption of the scanner operational mode, thus improving the reliability of the scanner.

This invention can also realize an automatic process of bringing the scanner to the optimal operational mode of scanning.

BRIEF DESCRIPTION OF ACCOMPANYING DRAWINGS

Other objects and advantages of this invention will become more apparent from the following detailed description of preferred embodiments thereof, taken in conjunction with the accompanying drawings, wherein.

BEST MODE FOR CARRYING OUT THE INVENTION

Figure 1:
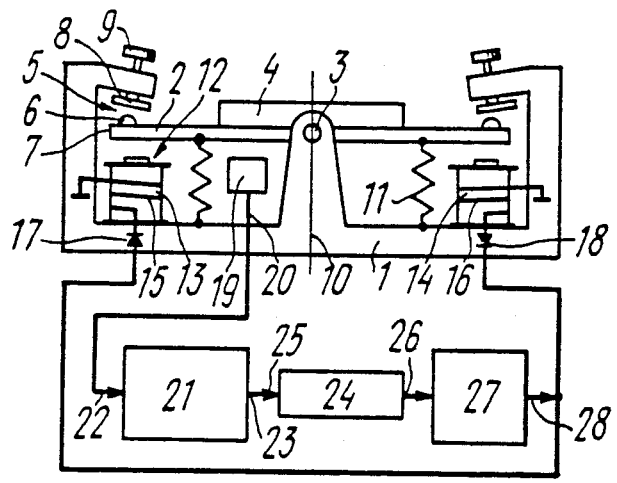
FIG. 1 shows a functional diagram of a scanner for industrial laser machines, according to the invention.

The scanner for industrial laser machines described herein below by way of example makes use of an electromechanical method of exciting oscillations.

A scanner for industrial laser machines comprises a housing 1 (FIG. 1) accomodating a rocker 2 on a shaft 3 about which the rocker 2 can tilt. The rocker 2 carries a scanning element made as a mirror 4. Identical collision pairs 5 are placed symmetrically in relation to the shaft 3 of the rocker 2. Each collision pair 5 comprises a first component 6 installed on a respective arm of the rocker 2 in the immediate vicinity of its butt end 7, and a second component 8 installed in the housing 1 so that it can interact with the component 6 when the mirror 4 moves. The second component 8 can be adjusted by means of a screw 9. Resilient members made as springs 11 are arranged symmetrically to the geometrical axis 10 of the scanner below the rocker 2. The springs 11 connect the rocker 2 to the housing 1. A means 12 for inducing mechanical oscillations of the scanning element is placed in the housing 1 beneath the rocker 2. The means 12 comprises two identical electromagnets 13 and 14 equipped with respective windings 15 and 16. The winding 15 is connected to the cathode of a control diode 17, while the winding 16 is connected to the anode of a control diode 18. A measuring transducer disposed beneath the rocker 2 can be made, for example, as a known photoelectric displacement transducer 19. An output 20 of the displacement transducer 19 is connected to an input 22 of a phase shift unit 21 whose output 23 is connected to an input 25 of a saturation unit 24 (cf., for example, V. A. Besekersky, E. P. Popov, Theory of Automatic Control Systems, Moscow, 1972, Nauka Publ., p. 548). An output 26 of the saturation unit 24 is connected to a power amplifier 27 whose output 28 is connected to the anode of the diode 17 and to the cathode of the diode 18.

Figure 2:
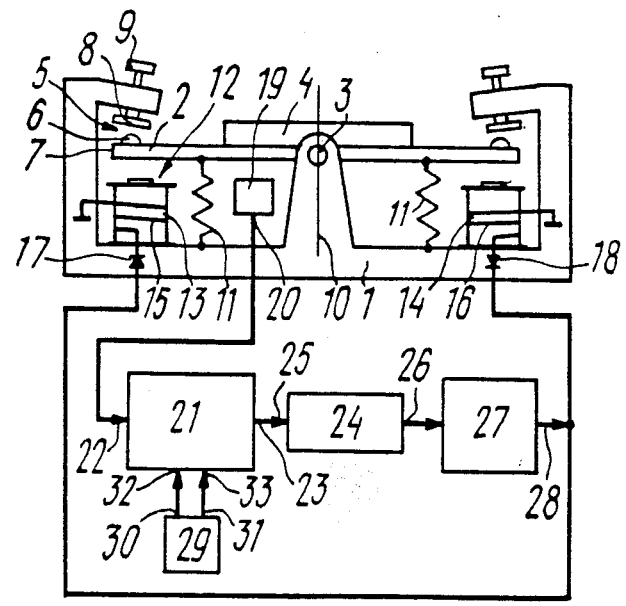
FIG. 2 shows a functional diagram of a scanner for industrial laser machines of FIG. 1 featuring a phase control mens, according to the invention.

The scanner is equipped with a phase shift control means for preliminary adjustment to the maximum oscillation frequency. This phase shift control means may be a known microprocessor 29 (FIG. 2) whose outputs 30 and 31 are connected, respectively, to control inputs 32 and 33 of the phase shift unit 21.

Figure 3:
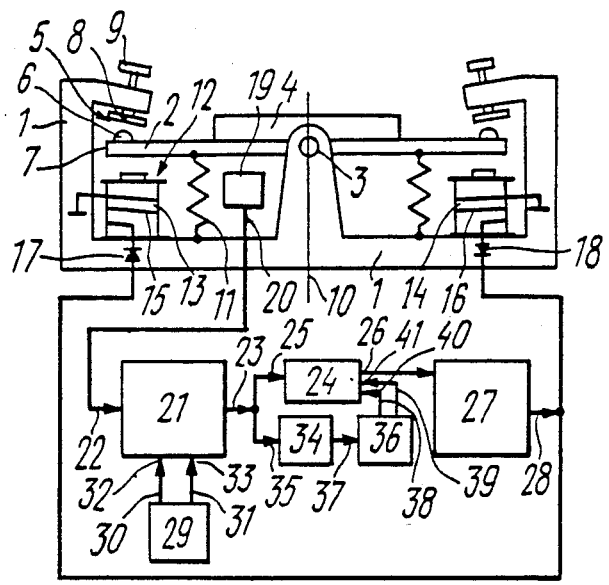
FIG. 3 shows functional diagram of a scanner for industrial laser machines of FIG. 2 featuring a frequency meter, according to the invention.

Another embodiment of the scanner for industrial laser machines additionally comprises a frequency meter 34 (FIG. 3) whose input 35 is connected to the output 23 of the phase shift unit 21 and a saturation level control unit 36 whose input 37 is connected to the frequency meter 34. Outputs 38 and 39 of the saturation level control unit 36 are connected to respective inputs 40 and 41 of the saturation unit 24.

Still another embodiment of the scanner for industrial laser machines additionally comprises a periodic signal generator 42 (FIG. 4) whose output 43 is joined with the output 26 of the saturation unit 24 in a point 44 and coupled to the amplifier 27.

Figure 5:
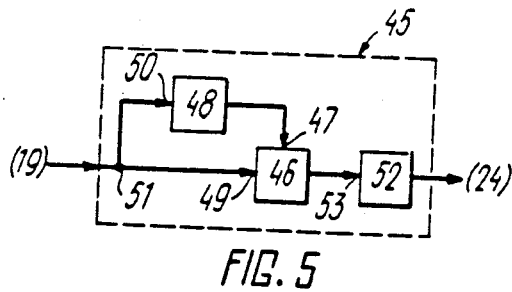
FIG. 5 shows a functional block diagram of a phase shifter, according to the invention.

One embodiment of the phase shift unit is a phase shifter 45 (FIG. 5) comprising a subtraction means 46 whose input 47 is connected to a differentiation means 48.

Inputs 49 and 50 of the means 46 and 48, respectively, are joined in a connection point 51 and constitute the input of the phase shifter 45 which is the input 22 (FIG. 1) of the phase shift unit 21. The output of the subtraction means 46 (FIG. 5) is connected to an input 53 of a first order aperiodic circuit 52. The output of the aperiodic circuit 52 is the output of the phase shifter 45, which is the output 23 (FIG. 1) of the unit 21.

Another embodiment of the phase shift unit is a correction circuit 54 (FIG. 6) comprising two addition means 55 and 56 whose inputs 57 and 58 are respectively connected to differentiation means 59 and 60. Inputs 61 and 62 of the means 55 and 59, respectively, are joined together and constitute an input of the correction circuit 54, which is the input 22 (FIG. 1) of the unit 21. Inputs 63 and 64 of the means 56 and 60, respectively, are joined together and connected to the means 55. An input 65 of a first order aperiodic circuit 66 is connected to the means 55. The output of the aperiodic circuit 66 is connected to an input 67 of another first order aperiodic circuit 68 whose output is the output of the correction circuit 54, which is the output 23 (FIGS. 2 and 1) of the unit 21.

Another embodiment of the phase shift unit 21 is a filter 69 (FIG. 7) comprising series-connected differentiation means 70 and 71. The output of the differentiation means 71 is connected to an input 73 of the differentiation means 72. Inputs 74 and 75 of the means 70 and 72, respectively, are joined in a connection point 76 and constitute the input of the filter 69, which is the input 22 (FIG. 1) of the phase shift unit 21. The differentiation means 72 is connected to an input 77 of a first order aperiodic circuit 78 whose output is connected to an input 79 of another first order aperiodic circuit 80. The output of the aperiodic circuit 80 is the output of the filter 69, which is the output 23 (FIG. 1) of the unit 21.

Still another embodiment of the phase shift unit 21 comprises a series-connected phase shifter 45 (FIG. 8) whose input is the input 22 (FIG. 1) of the phase shift unit 21 and a correction circuit 54 (FIG. 8) whose output is the output 23 (FIG. 1) of the unit 21.

One more embodiment of the phase shift unit 21 comprises a series-connected phase shifter 45 (FIG. 9) whose input is the input 22 (FIG. 1) of the phase shift unit 21 and a filter 69 (FIG. 9) whose output is the output 23 (FIG. 1) of the phase shift unit 21.

Still one more embodiment of the phase shift unit 21 comprises a correction circuit 54 (FIG. 10) whose input is the input 22 (FIG. 1) of the phase shift unit 21 and the filter 69 (FIG. 10) connected in series to the correction circuit 54, whose output is the output 23 (FIG. 1) of the phase shift unit 21.

Yet another embodiment of the phase shift unit 21 comprises a series-connected chain including the phase shifter 45 (FIG. 11) whose input is the input 22 (FIG. 1) of the phase shift unit 21, the correction circuit 54 (FIG. 11), and the filter 69 whose output is the output 23 (FIG. 1) of the phase shift unit 21.

Figure 12:
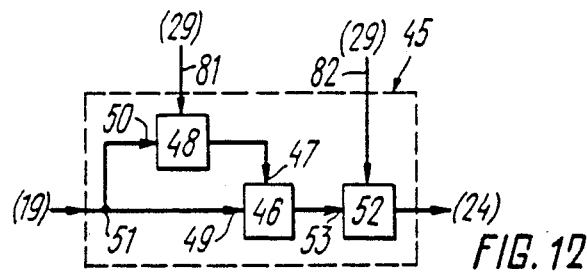
FIG. 12 shows a functional block diagram of a phase shifter of FIG. 5 featuring control inputs, according to the invention.

Referring to FIG. 12, an embodiment of the phase shift unit 21 (FIGS. 2, 3, 4) comprises a phase shifter 45 (FIG. 5) wherein the means 48 and aperiodic circuit 52 are provided with control inputs which are control inputs 81 and 82 (FIG. 12) of the phase shifter 45 and, respectively, the control inputs 32 and 33 (FIGS. 2, 3, 4) of the unit 21.

Figure 13:
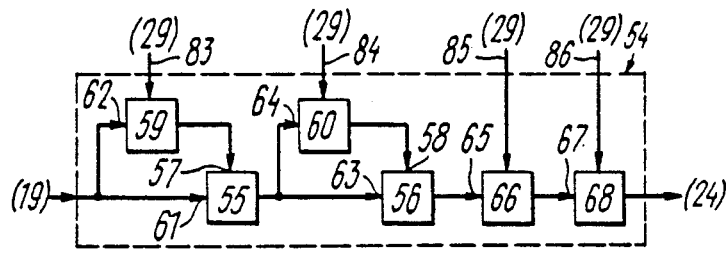
FIG. 13 shows a functional block diagram of a correction circuit of FIG. 6 featuring control inputs, according to the invention.

Referring to FIG. 13, an embodiment of the phase shift unit 21 is a correction circuit 54 (FIG. 6) wherein the means 59 and 60 and aperiodic circuits 66 and 68 are provided with control inputs which are, respectively, control inputs 83, 84, 85, and 86 (FIG. 13) of the aperiodic circuit 54 and, consequently, of the phase shift unit 21 (not shown).

Figure 14:
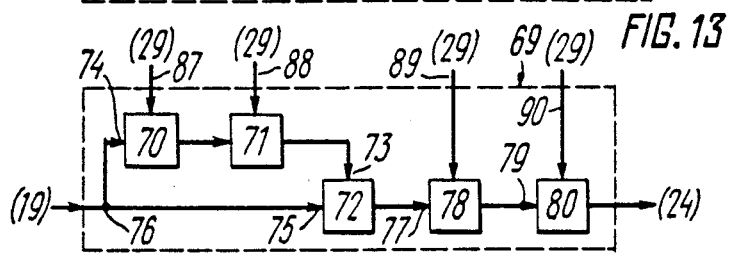
FIG. 14 shows a functional block diagram of a filter of FIG. 7 featuring control inputs, according to the invention.
Figure 19:
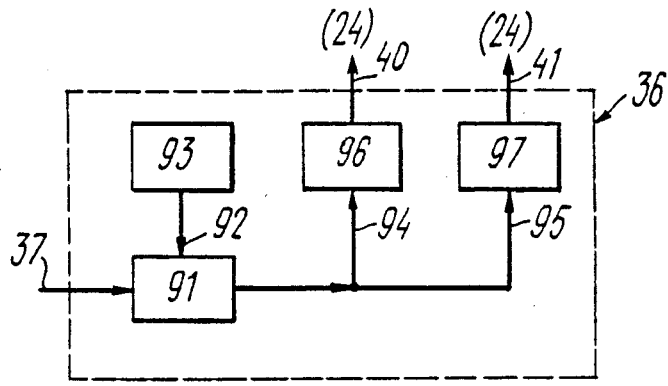
FIG. 19 shows a functional block diagram of a saturation level control unit as shown in FIG. 3, according to the invention.

Referring to FIG. 14, an embodiment of the phase shift unit 21 is a filter 69 (FIG. 7) wherein the means 70 and 71 and circuits 78 and 80 are provided with control inputs which are control inputs 87, 88, 89, and 90 (FIG. 19) and, consequently, of the unit 21 (not shown).

Figure 8:
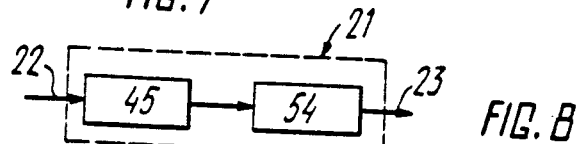
FIG. 8 shows a functional block diagram of a phase shift unit featuring a phase shifter and a correction circuit, according to the invention.
Figure 15:
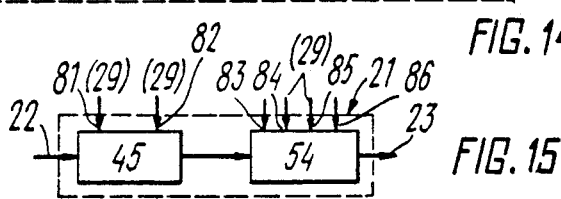
FIG. 15 shows a functional block diagram of a phase shift unit as shown in FIG. 8 featuring control inputs, according to the invention.

Referring to FIG. 15, an embodiment of the phase shift unit 21 is analogous to that of FIG. 8 with one exception consisting in that the unit 21 is provided with control inputs which are the inputs 81 and 82 of the phase shifter 45 and inputs 83, 84, 85, and 86 of the correction circuit 54.

Figure 9:
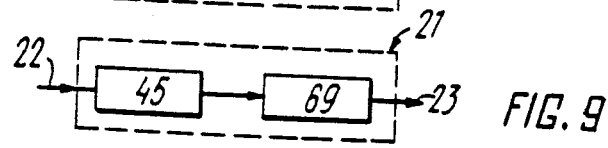
FIG. 9 shows a functional block diagram of a phase shift unit featuring a phase shifter and a filter, according to the invention.
Figure 16:
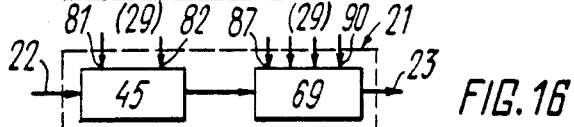
FIG. 16 shows a functional block diagram of a phase shift unit as shown in FIG. 9 featuring control inputs, according to the invention.

Referring to FIG. 16, an embodiment of the phase shift unit 21 is analogous to that of FIG. 9 with one exception consisting in that the phase shift unit 21 is provided with control inputs which are the inputs 81 and 82 of the phase shifter 45 and inputs 87, 88, 89, and 90 of the filter 69.

Figure 10:
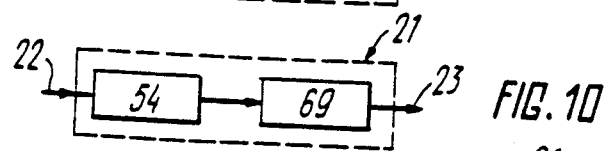
FIG. 10 shows a functional block diagram of a phase shift unit featuring a correction circuit and a filter, according to the invention.
Figure 17:
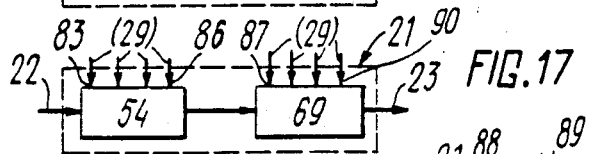
FIG. 17 shows a functional block diagram of a phase shift unit as shown in FIG. 10 featuring control inputs, according to the invention.

Referring to FIG. 17, an embodiment of the phase shift unit 21 is analogous to that shown in FIG. 10 with the exception consisting in that the phase shift unit 21 is provided with control inputs which are the inputs 83, 84, 85, and 86 of the correction circuit 54 and inputs 87, 88, 89, and 90 of the filter 69.

Figure 11:
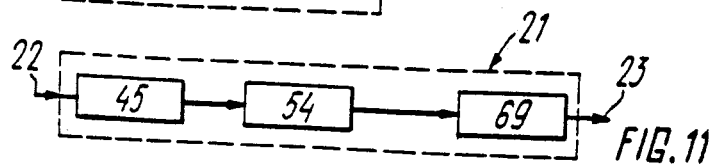
FIG. 11 shows a functional block diagram of a phase shift unit featuring a phase shifter, a correction circuit, and a filter, according to the invention.
Figure 18:
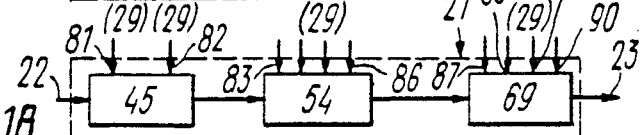
FIG. 18 shows a functional block diagram of a phase shift unit as shown in FIG. 11 featuring control inputs, according to the invention.

Referring to FIG. 18, an embodiment of the phase shift unit 21 is analogous to that shown in FIG. 11 with an exception consisting in that the phase shift unit 21 is provided with control inputs which are the inputs 81 and 82 of the filter 45, inputs 83, 84, 85, and 86 of the correction circuit 54, and inputs 87, 88, 89, and 90 of the filter 69.

The saturation level control unit 36 (FIG. 3) comprises a division unit 31 whose one input is the input 37 of the saturation level control unit 36, while another input 92 is connected to a constant voltage source 93. The output of the division unit 91 is connected to inputs 94 and 95 of the inverting and noninverting amplifiers 96 and 97, respectively. The outputs of the amplifiers 96 and 97 are, respectively, the outputs 38 and 39 of the unit 36.

Figure 20:
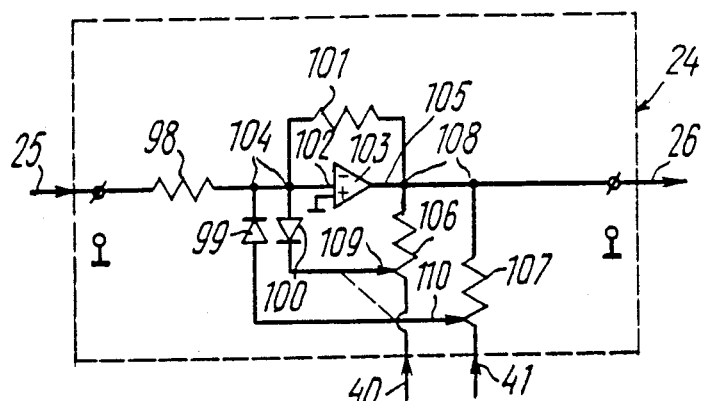
FIG. 20 shows a schematic diagram of a saturation unit.

The known saturation unit 24 (V. A. Besekersky, E. P. Popov, Theory of Automatic Control Systems, Moscow, 1972, NAUKA Publ., p. 196) comprises a resistor 98 (FIG. 20) whose one lead is the input 25 of the saturation unit 24, while the other lead is connected to the cathode of a diode 99, the anode of a diode 100, a lead of a resistor 101, and an inverting input 102 of an operational amplifier 103 in a connection point 104. The other input of the operational amplifier 103 is grounded. The other lead of the resistor 101, an output 105 of the operational amplifier 103, and some leads of tandem variable resistors 106 and 107 are joined in a connection point 108 which is the output 26 of the saturation unit 24. Other leads of the resistors 106 and 107 are, respectively, the control inputs 40 (FIG. 3) and 41 of the saturation unit 24. Current collectors 109 and 110 of the resistors 106 and 107, respectively, are connected to the cathode of the diode 100 and to the anode of the diode 99, respectively.

Figure 22:
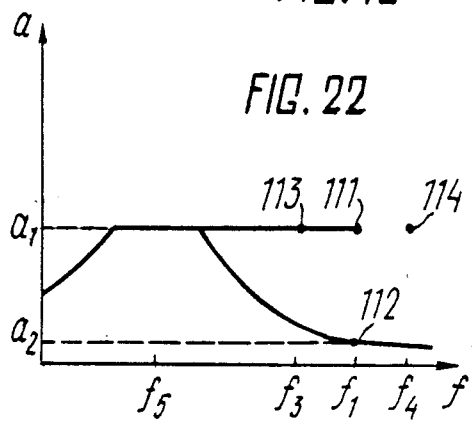
FIG. 22 shows an amplitude-frequency characteristic of the scanner for industrial laser machines.
Figure 21:
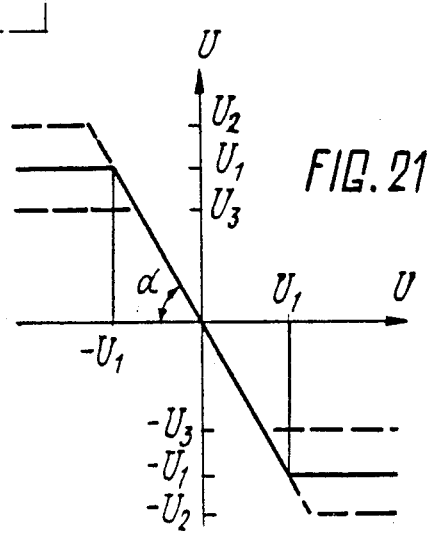
FIG. 21 shows a plot of the output voltage of the saturation unit as a function of the input voltage thereof.

The scanner for industrial lasers, as shown in FIGS. 1, 21, and 22, operates as follows.

Conventionally, the operation of a scanner for industrial laser machines consists in that a mirror periodically deflects the laser beam of a powerful industrial laser (not shown in the drawings). The deflected beam is directed to a workpiece to be laser treated.

The angular displacement of the mirror 4 is sensed by the photoelectric transducer 19 and converted into an electric signal proportional to the angle to which the mirror 4 is turned. The signal is further delivered from the output 20 of the transducer 19 to the input 22 of the phase shift unit 21 which changes the phase of the signal and supplied it from the output 23 thereof to the input 25 of the saturation unit 24.

When the voltage amplitude at the input 25 (FIG. 1) of the saturation unit 24 is low $u<u_1$ (as shown in FIG. 21), which is typical for a process leading to steady-state mechanical oscillation conditions, the voltage U at the output 26 of the saturation unit 24 is increased by a factor of k (where $k+tg\alpha$ and $\alpha$ is the slope of the curve $U(u)$ in FIG. 21).

When the amplitude of the voltage $u>u_1$, the amplitude of the voltage U remains constant and equal to the saturation level $U_1$ (shown in FIG. 21). Then, the voltage at the output 26 of the unit 24 is equal $U=U_1$ or $U=-U_1$. The signal taken from the output 26 of the saturation unit 24 is supplied to the power amplifier 27. The amplified signal from the output 28 of the power amplifier 27 is fed to the electromagnets 13 and 14 of the means 12 for inducing mechanical oscillations in order to set the rocker 2 and the mirror 4 in motion.

In this manner the scanner is self-excited and reaches stationary optimal (sawtooth) conditions of scanning of the mirror 4 with the frequency $f_1$ (FIG. 22) and amplitude $a_1$ (FIG. 22) of the angular displacements, which correspond to the point 111 (FIG. 22) on the amplitude-frequency curve of the scanner. In these conditions, fluctuations of scanner parameters, such as supply voltage of the electromagnets 13 and 14, for example, do not upset the optimal operating conditions to a collision-free harmonic mode of operation with the amplitude $a_2$ ($f_2$), which corresponds to the point 112 (FIG. 22).

When the scanner is readjusted to a different scanning frequency, the phase shift may have to be altered in order to reach again the optimal operating conditions. To this end, signals are to be applied from the outputs 30 (FIG. 2) and 31 of the microprocessor 29 to respective control inputs 32 and 33 of the unit 21 and change the phase shift by a required value.

The scanner for industrial laser machines, as shown in FIGS. 3, 19, 20, 21, and 22, operates as follows.

Basically, the scanner operates similarly to the one described above. But, here the scanning frequency is stabilized to achieve a stable scanning speed. To this end, the signal taken from the output 23 of the unit 21 is also supplied to the input 35 of the frequency meter 34 to be transformed into a signal whose frequency is the function of the oscillation frequency of the mirror 4 and delivered to the input 37 of the saturation level control unit 36. The unit 36 produces control signals supplied from the outputs 38 and 39 thereof to the control inputs 40 and 41 of the saturation unit 24. Both positive and negative saturation levels $U_1$ and $-U_1$ are produced in the unit 24.

The saturation levels $U_1$ and $-U_1$ are produced in the unit 24 as follows.

The signal applied to the input 25 (FIG. 20) of the saturation unit 24 is further supplied, via the resistor 98, to the inverting input 102 of the operational amplifier 103. The negative feedback voltage is also supplied to the input 102 of the operational amplifier 103 from the output 105 via the resistor 101. When the voltage amplitudes $u<u_1$ (FIG. 21) at the input 25, current flows from the control input 40 via the resistors 106 and 107 to the control input 41 and produces potentials on the current collectors 109 and 110, which render nonconductive diodes 100 and 99, respectively. In this case, the gain factor of the saturation unit 24 and the voltage U at its output 26 are dictated by the ratings of the resistors 98 and 101. When the voltage amplitude $u>u_1$ at the input 25 of the saturation unit 24, in other words, when the unit 24 is in saturated condition, diodes 99 and 100 become conductive and funish additional feedbacks for the amplifier 103, which reduce the gain factor of the saturation unit 24 so that the positive and negative saturation levels at the output 26 remain equal, respectively, to the levels $U_1$ and $-U_1$ (FIG. 21).

The saturation levels $U_1$ and $-U_1$ are controlled as follows.

A signal of the frequency meter 34 is supplied to one input of the division unit 91, while a signal of the constant voltage source 93 is supplied to the input 92. The division unit 91 transforms these signals into a signal whose magnitude is equal to the ratio of the voltage at the input 92 and the voltage applied to the input of the division unit 91 from the frequency meter 34. The signal obtained in the division unit 91 is supplied to the inputs 94 and 95 of the inverting and noninverting amplifiers 96 and 97, respectively, where its magnitude is increased, and in the amplifier 96 the sign is also changed. The signal is then supplied from the outputs of the amplifiers 96 and 97 to the control inputs 40 and 41, respectively, of the saturation unit 24. Potentials at the inputs 40 and 41 vary with the fluctuations of the scanner parameters, and so do potentials at the current collectors 109 and 110 and the saturation levels $U_1$ and $-U_1$. When frequencies reach values $f_3$ or $f_4$ (FIG. 22) which correspond to the points 113 and 114 (FIG. 22), the saturation levels $U_1$ and $-U_1$ change, respectively, to $U_2$, $-U_2$ and $U_3$, $-U_3$ (FIG. 22). The scanning frequency also changes and becomes close to the desired frequency $f_1$.

The assigned scanning speed and respective oscillation frequency and amplitude can be adjusted by placing the current collectors 109 and 110 of the resistors 106 and 107 to an appropriate position.

Figure 4:
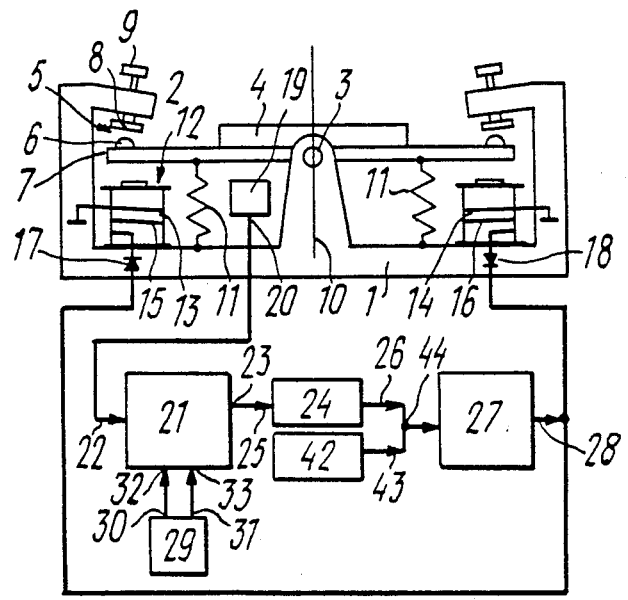
FIG. 4 shows a functional block diagram for industrial laser machines of FIG. 2 featuring a periodic signal generator, according to the invention.

The scanner for industrial laser machines, as shown in FIGS. 4 and 22, operates as follows.

Basically, the operation of this scanner is similar to that of FIG. 1. But, the signal taken from the output 26 of the saturation unit 24 is added to the signal taken from the output 43 of the periodic signal generator 42, which changes at the assigned scanning frequency. The mirror 4 oscillates with the frequency assigned by the generator 42, which is the manifestation of the well known effect of near-harmonic oscillations, when the frequency of the driving harmonic action "locks in" the free-running frequency. In contrast to the well known effect, the above fenomenon occurs during the sawtooth movement law at a frequency $f_1$ (FIG. 22) which is much higher than the natural frequency $f_5$ (FIG. 22) of the oscillatory system comprising the rocker 2 with the mirror 4 and springs 11.

When a large phase shift is required in scanners for industrial laser machines, as shown in FIGS. 1, 2, 3, 4, the signal of the transducer 19 is supplied to the inputs 50 and 49 (FIG. 5) of the differentiation means 48 and the subtraction means 46 of the phase shifter 45, respectively. The means 48 differentiates the signal and changes its magnitude in compliance with its transmission function $W(p) = Tp$, where $p = d/dt$ is the differentiation operator and T is the time constant of the means 48. The signal is further fed from the means 48 to the input 47 of the means 46 where it is subtracted from the signal which had been delivered to the input 49.

The resulting signal is taken from the means 46 to the input 53 of the first order aperiodic circuit 52 whose transfer function is $W(p) = k_1/(1 + T_1 p)$, where $k_1$ is a constant factor, and $T_1$ is the time constant of the aperiodic circuit 52 equal to T so that $T_1 = T$. The aperiodic circuit 52 changes the magnitude and phase of the signal and supplies it to the input 25 of the saturation unit 24.

When the scanner is adjusted to another phase shift, as described above, signals taken from the outputs 30 (FIGS. 2, 3, 4) and 31 of the microprocessor 29 are supplied to the inputs 81 (FIG. 12) and 82 of the phase shifter 45, that is to respective control inputs of the means 48 and the aperiodic circuit 52, in order to change their time constants. The phase shift is thus changed by a required value.

Figure 6:
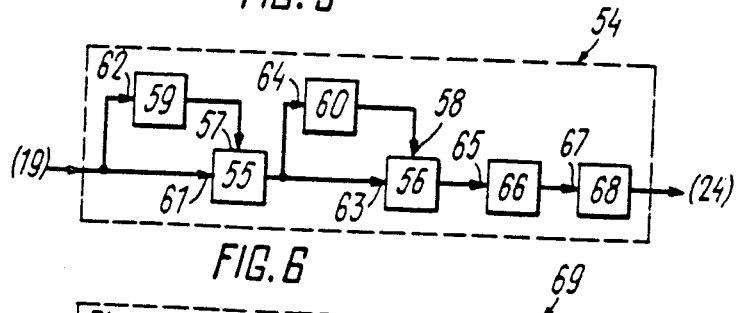
FIG. 6 shows a functional block diagram of a correction circuit, according to the invention.

When a small phase shift is required and phase shifts in the electromagnets 13 and 14, the transducer 19, the saturation unit 24, and the amplifier 27 are to be corrected at various desired scanning frequencies in scanners for industrial laser machines of FIGS. 1, 2, 3, and 4, the signal taken from the transducer 19 is supplied to the inputs 62 and 61 of the diffentiation means 59 and addition means 55 of the correction circuit 54 (FIG. 6). After differentiation in the means 59, the signal is supplied to the input 57 of the addition means 55 where it is added to the signal fed from the input 61. The resulting signal is supplied to the inputs 64 and 63 of the differentiation means 60 and addition means 56, respectively. After differentiation in the means 60, the signal is supplied to the input 58 of the addition means 56 where it is added to the signal fed from the input 63. The amplitude and phase of the resulting signal are changed successively by the first order aperiodic circuits 66 and 68. The signal is then further supplied from the aperiodic circuit 68 to the input 25 of the saturation unit 24. The time constants of the means 59 and 60 of the aperiodic circuits 66 and 68 are selected to be different, while their transfer functions re analogous to those described above.

During scanner adjustment described above, signals from respective outputs (not shown) of the microprocessor 29 are supplied to the inputs 83 (FIG. 13), 84, 85, and 86 of the correction circuit 54, that is to respective control inputs of the means 59 and 60 and aperiodic circuits 66 and 68, and change their time constants. The phase shift is thus adjusted to a desired value.

Figure 7:
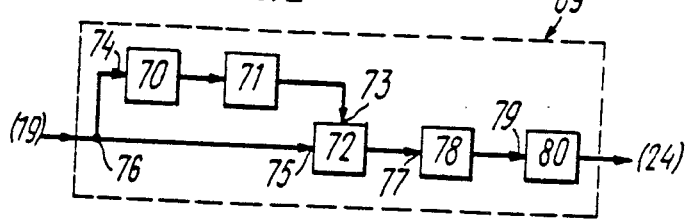
FIG. 7 shows a functional block diagram of a filter, according to the invention.

When the desired phase shifts are small and when some operational frequency ranges are to be eliminated in scanners of FIGS. 1, 2, 3, 4, the signal from the transducer 19 is supplied to the inputs 74 and 75 of the differentiation means 70 and addition means 72 of the filter 69 (FIG. 7). The signal is twice successively differentiated in the means 70 and 71 and supplied to the input 73 of the means 72 where it is added to the signal fed from the input 75. The resulting signal is delivered to the input 77 of the first order aperiodic circuit 78. The amplitude and phase of this signal are successively changed by the first order aperiodic circuits 78 and 80. Then the signal is supplied from the aperiodic circuit 80 to the input 25 of the saturation unit 24. The time constants of the means 70 and 71 are selected to be equal to each other, while the time constants of the aperiodic circuits 78 and 80 should be different from those.

When the phase shift of the scanner is adjusted as described above, signals from respective outputs (not shown) of the microprocessor 29 are supplied to the inputs 87 (FIG. 14), 88, 89, and 90 of the filter 69, that is to respective control inputs of the means 70 and 71 and aperiodic circuits 78 and 80 are change their time constants. The phase shift is thus adjusted to a desired value.

The operation of scanners for industrial laser machines of FIGS. 1, 2, 3, 4 is described below for different embodiments of the phase shift unit 21, when different application conditions are to be complied with by using different combinations of the phase shifter 45 (FIGS. 5 and 12), correction circuit 54 (FIGS. 6 and 13), and filter 69 (FIGS. 7 and 14) whose operation has been described already above.

The signal is applied to the input 22 (FIG. 8) and fed successively to the phase shifter 45 and the correction circuit 54 of the phase shift unit 21. The latter performs the phase shift of the signal in compliance with the conditions described above in relation to the operation of the phase shifter 45 (FIGS. 5, 12) and the correction unit 54 (FIGS. 6, 13). The phase shift is adjusted by feeding signals from respective outputs (not shown) of the microprocessor 29 to the control inputs 81 (FIG. 15), 82, 83, 84, 85, and 86.

The signal applied to the input 22 (FIG. 9) is supplied successively to the phase shifter 45 and filter 69 of the phase shift unit 21. The latter performs the phase shift of the signal on the conditions described above when dealing with the operation of the phase shifter 45 (FIGS. 5, 12) and filter (FIGS. 7, 14). The phase shift is adjusted by feeding signals from respective outputs (not shown) of the microprocessor 29 to the control inputs 81 (FIG. 16), 82, 87, 88, 89, and 90.

The signal applied to the input 22 (FIG. 10) is supplied successively to the correction circuit 54 and filter 69 of the phase shift unit 21. The latter shifts the phase of the signal on the conditions described above in relation to the operation of the correction circuit 54 (FIGS. 6, 13) and filter 69 (FIGS. 7, 14). The phase shift is adjusted by feeding signals from respective outputs (not shown) of the microprocessor 29 to the control inputs 83 (FIG. 17), 84, 85, 86, 87, 88, 89, and 90.

The signal applied to the input 22 (FIG. 11) is supplied successively to the phase shifter 45, the correction circuit 54, and the filter 69 of the phase shift unit 21. The latter shifts the phase of the signal on the conditions described above when dealing with the operation of the phase shifter (FIGS. 5, 12), the correction circuit 54 (FIGS. 6, 13), and the filter 69 (FIGS. 7,14). The phase shift is effected by feeding signals from respective outputs (not shown) of the microprocessor 29 to the control inputs 81 (FIG. 18), 82, 83, 85, 86, 87, 88, 89, and 90.

The scanner for industrial laser machines can also be equipped with a means for inducing mechanical oscillations, making use of well known electrodynamic, magnetostriction, pneumatic, or hydraulic vibration exciters.

This invention makes it possible to achieve optimal operational conditions of the scanner without increasing its power consumption.

Besides, this invention provides an automatic device which eliminates participation of an operator so that the scanner can be used in automatic adjustable laser treatment systems in unmanned manufacturing environment.

Moreover, this invention provides a wider scanning frequency range extending both into the higher and lower scanning frequencies, and, also, a wider range of scanning amplitudes, which makes the field of application of the scanner much broader.

Industrial Applicability

This invention can be employed for manufacturing durable precision units and machine components in various fields, such as aircraft industry, automotive tractor industry, and machine-tool industry. It can be used for automated hardening, welding, cutting, and surface heat treatment of metal workpieces.

In addition, this invention can be used in measurement technology based on scanning, including instruments installed on mobile objects.

We claim:

1. A scanner for industrial laser machines, comprising a housing accomodating a movable scanning element, a means for inducing mechanical oscillations of the scanning element, which is mechanically connected with the housing, at least two collision pairs, each pair having two components secured so that they can interact with each other during the movement of the scanning element, one component being secured on the scanning element and the other in the housing, characterized in that it additionally comprises a measuring transducer (19) which responds to mechanical oscillations of the scanning element (4), a phase shift unit (21) whose input (22) is connected to the measuring transducer (19), a saturation unit (24) whose input (25) is connected to an output (23) of the phase shift unit (21), and a power amplifier (27) whose input is connected to the saturation unit (24) and whose output (28) is connected to the means (1,2) for inducing mechanical oscillations of the scanning element (4).

2. A scanner as claimed in claim 1, characterized in that it also comprises a frequency meter (34) connected to the output (23) of the phase shift unit (21) and a saturation level control unit (36) connected to the frequency meter (34); the saturation unit (24) is provided with at least two control inputs (40,41) connected to respective outputs (38, 39) of the saturation level control unit (36).

3. A scanner as claimed in claim 2, characterized in that the saturation level control unit (36) comprises a division unit (91) having one input as an input (37) of the saturation level control unit (36) and the other input (92) connected to a constant voltage source (93), an inverting direct-coupled amplifier (96) and a non-inverting direct-coupled amplifier (97), the input (94,95) of each amplifier being connected to the output of the division unit (91), while the output of each amplifier is the respective output (40,41) of the saturation level control unit (36).

4. A scanner as claimed in claim 1, characterized in that it also comprises a periodic signal generator (42) having an output (43) joined with the output (26) of the saturation unit (24) and connected to the input of the power amplifier (27).

5. A scanner as claimed in any of the claims 1,2, or 4, characterized in that the phase shift unit (21) comprises a component selected from a group including a phase shifter (45), a correction circuit (54), and a filter (69), in this order, individually or in combination.

6. A scanner as claimed in claim 5, characterized in that the phase shift unit (21) comprises a phase shifter (45) and a correction circuit (54) connected in series to each other.

7. A scanner as claimed in claim 5, characterized in that the phase shift unit (21) comprises a phase shifter (45) and a filter (69) connected in series to each other.

8. A scanner as claimed in claim 5, characterized in that the phase shift unit (21) comprises a correction circuit (54) and a filter (69) connected in series to each other.

9. A scanner as claimed in claim 5, characterized in that the phase shift unit (21) comprises a phase shifter (45), a correction circuit (54), and a filter (69) connected in series to one another.

10. A scanner as claimed in claim 1, characterized in that the phase shift unit (21) also comprises at least two control inputs (32, 33), while the scanner additionally comprises a phase shift control means (29) having outputs (30,31) whose number is equal to that of control inputs (32, 33) of the phase shift unit (21), each said output being connected to respective input (32, 33) of the phase shift unit (21).

11. A scanner as claimed in claim 5, characterized in that the phase shifter (45) has two control inputs (81, 82), each said input being connected to respective output of the phase shift control means (29).

12. A scanner as claimed in claim 5, characterized in that the correction circuit (54) has four control inputs (83, 84, 85, 86), each said input being connected to respective output of the phase shift control means (29).

13. A scanner as claimed in claim 5, characterized in that the filter (69) has four control inputs (87, 88, 89, 90), each said input being connected to respective output of the phase shift control means (29).

14. A scanner as claimed in claim 10, characterized in that the phase shift control means (29) is a microprocessor.

15. A scanner as claimed in claim 2, characterized in that the phase shift unit (21) also comprises at least two control inputs (32, 33), while the scanner additionally comprises a phase shift control means (29) having outputs (30, 31) whose number is equal to that of control inputs (32, 33) of the phase shift unit (21), each said output being connected to respective input (32, 33) of the phase shift unit (21).

16. A scanner as claimed in claim 3, characterized in that the phase shift unit (21) also comprises at least two control inputs (32, 33), while the scanner additionally comprises a phase shift control means (29) having outputs (30, 31) whose number is equal to that of control inputs (32, 33) of the phase shift unit (21), each said output being connected to respective input (32, 33) of the phase shift unit (21).

17. A scanner as claimed in claim 4, characterized in that the phase shift unit (21) also comprises at least two control inputs (32, 33), while the scanner additionally comprises a phase shift control means (29) having outputs (30, 31) whose number is equal to that of control inputs (32, 33) of the phase shift unit (21), each said output being connected to respective input (32, 33) of the phase shift unit (21).

18. A scanner as claimed in claim 10, characterized in that the phase shifter (45) has two control inputs (81, 82), each said input being connected to respective output of the phase shift control means (29).

19. A scanner as claimed in claim 15, characterized in that the phase shifter (45) has two control inputs (81, 82), each said input being connected to respective output of the phase shift control means (29).

20. A scanner as claimed in claim 16, characterized in that the phase shifter (45) has two control inputs (81, 82), each said input being connected to respective output of the phase shift control means (29).

21. A scanner as claimed in claim 17, characterized in that the phase shifter (45) has two control inputs (81, 82), each said input being connected to respective output of the phase shift control means (29).

22. A scanner as claimed in claim 10, characterized in that the correction circuit (54) has four control inputs (83, 84, 85, 86), each said input being connected to respective output of the phase shift control means (29).

23. A scanner as claimed in claim 15, characterized in that the correction circuit (54) has four control inputs (83, 84, 85, 86), each said input being connected to respective output of the phase shift control means (29).

24. A scanner as claimed in claim 16, characterized in that the correction circuit (54) has four control inputs (83, 84, 85, 86), each said input being connected to respective output of the phase shift control means (29).

25. A scanner as claimed in claim 17, characterized in that the correction circuit (54) has four control inputs (83, 84, 85, 86), each said input being connected to respective output of the phase shift control means (29).

26. A scanner as claimed in claim 10, characterized in that the filter (69) has four control inputs (87, 88, 89, 90), each said input being connected to respective output of the phase shift control means (29).

27. A scanner as claimed in claim 15, characterized in that the filter (69) has four control inputs (87, 88, 89, 90), each said input being connected to respective output of the phase shift control means (29).

28. A scanner as claimed in claim 16, characterized in that the filter (69) has four control inputs (87, 88, 89, 90), each said input being connected to respective output of the phase shift control means (29).

29. A scanner as claimed in claim 17, characterized in that the filter (69) has four control inputs (87, 88, 89, 90), each said input being connected to respective output of the phase shift control means (29).

30. A scanner as claimed in claim 10, characterized in that the phase shift control means (29) is a microprocessor.

31. A scanner as claimed in claim 15, characterized in that the phase shift control means (29) is a microprocessor.

32. A scanner as claimed in claim 16, characterized in that the phase shift control means (29) is a microprocessor.

33. A scanner as claimed in claim 17, characterized in that the phase shift control means (29) is a microprocessor.

* * * * *